United States Patent Office 3,321,441
Patented May 23, 1967

3,321,441
DIALKYL KETENE POLYMERS PREPARED WITH BUTYL LITHIUM CATALYST
George O. Cash, Jr., and James C. Martin, Kingsport, Tenn., assignors to Eastman Kodak Company, Rochester, N.Y., a corporation of New Jersey
No Drawing. Filed May 9, 1961, Ser. No. 108,741
3 Claims. (Cl. 260—63)

This invention relates to novel polymers of di-substituted ketenes and their process of preparation. More particularly, this invention relates to novel dialkyl ketene polymers having properties which make them particularly valuable in the preparation of films and fibers. In a specific aspect, this invention relates to novel dialkyl ketene polymers which are prepared in the presence of strongly basic catalysts.

It is known that di-substituted ketenes, for example, dimethyl ketene, will dimerize upon heating or, in some cases, upon standing at room temperature or below. However, prior art workers have been unsuccessful in their efforts to polymerize di-substituted ketenes to thermally stable polymers having the molecular weights, crystallinities and melting points whcih make a polymer suitable for fiber and film formation. For example, the polymerization of dialkyl ketenes is reported in Helv. Chim. Acta, 8, 322–332 (1925), wherein it is disclosed that dimethyl ketene can be polymerized using an amine as the catalyst. The resulting polymer, which is probably a polyketene acetal, does exhibit a melting point of 200° C. (with decomposition) but, although solid and glassy when first prepared, it tends to become sticky and degrades upon standing. It is quite obvious that polymers of this type are unsuitable for use in the preparation of films and fibers. It is evident, therefore, that the state of the art will be greatly enhanced by providing novel di-substituted ketene polymers having the necessary characteristics which make them suitable for fiber and film formation. Likewise, a noteworthy contribution to the art will be a method for the preparation of such polymers.

Accordingly, it is an object of this invention to provide novel polymers of di-substituted ketenes.

Another object of this invention is to provide novel di-substituted ketene polymers having molecular weights, crystallinities and melting points which make them eminently suited to fiber and film formation.

Another object of this invention is to provide novel, highly crystalline dialkyl ketene polymers that can be used in preparing good quality protective coatings as well as films and fibers.

Another object of this invention is to provide a process for the preparation of these novel di-substituted ketene polymers.

Still another object of this invention is to provide a convenient, commercially feasible process for the polymerization of di-substituted ketenes using strongly basic catalysts.

Other objects and advantages of the invention will become apparent from an examination of the description and claims which follow.

According to this invention, therefore, thermally stable, macromolecular, highly crystalline, high melting di-substituted ketene polymers consisting essentially of units having the formula:

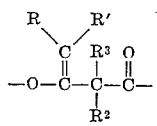

wherein R, R', $R^2$ and $R^3$ are alkyl radicals containing 1 to 4 carbon atoms, are obtained by polymerizing dialkyl ketenes in the presence of catalytic amounts of a strongly basic polymerization catalyst, as hereinafter described.

The di-substituted ketenes that are employed in the process of this invention are well known in the art and are available in quantity by a process described in the copending application of R. H. Hasek and E. U. Elam, Ser. No. 841,961, filed Sept. 24, 1959 now U.S. Patent No. 3,201,-474. The alkyl groups which can be present in the dialkyl ketenes employed in the process of this invention contain 1 to 4 carbon atoms, need not be the same and include, for example, methyl, ethyl, propyl, isopropyl, butyl, isobutyl and the like. Compounds such as dimethyl ketene, methylethyl ketene, diethyl ketene, methylpropyl ketene, butylethyl ketene and dibutyl ketene can be employed in making the novel polymers of this invention. Furthermore, the starting material used in the polymerization process can be a mixture of two or more dialkyl ketenes, in any molar ratio, in which case the resulting polymer will have various combinations of $C_1$–$C_4$ alkyl groups present.

As already indicated, a mixture of two or more dialkyl ketenes can be employed in preparing the novel polymers of this invention. The dialkyl ketenes described herein can also copolymerize with different unsaturated copolymerizable compounds containing one or more —CH=C< groups or more particularly, one or more $CH_2$=C< groups. Suitable unsaturated monomers of this type include any of the well known ethylenically unsaturated polymerizable compounds such as vinyl esters, amides, nitriles, ketones, halides, ethers, $\alpha,\beta$-unsaturated acids or esters thereof, olefins, diolefins and the like as exemplified by acrylonitrile, methacrylonitrile, ethylene oxide, ethyl acrylate, vinyl pyridine, N-ethyl acrylamide, styrene, $\alpha$-methyl styrene, vinyl chloride, vinylidene chloride, methyl vinyl ketone, pivalolactone, vinyl acetate, fumaric, maleic and itaconic esters, 2-chloroethyl vinyl ether, methyl malonitrile, acrylic acids, methacrylic esters, N-vinyl succinamide, N-vinyl phthalamide, N-vinyl pyrrolidone, butadiene, isoprene, vinyldiene cyanide, ethylene, propylene and the like. In addition, the dialkyl ketenes can be replaced by other di-substituted ketenes, for example, diaryl ketenes, dialkaryl ketenes or dialkyl ketenes in which the alkyl groups contain more than 4 carbon atoms and the like. Furthermore, alicyclic ketenes, for example, pentamethylene ketene, may also be employed in the polymerization procedure disclosed herein.

The novel poly(enol esters) of this invention, as already indicated, are characterized by units having the formula:

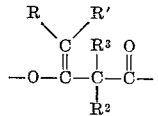

wherein R, R', $R^2$ and $R^3$ are as defined above, and have a high molecular weight. The structure of these polymers has been confirmed by (1) elemental analysis, (2) infrared spectroscopy and (3) chemical behavior, as shown in the following examples. The molecular weights of the novel polymers of this invention are determined by measuring their inherent viscosities in tetralin at 145° C. which inherent viscosities are in the range of about .25 to about 1.1 and more preferably in the range of about .26 to about .45. The inherent viscosity referred to in the specification and claims is determined in tetralin at 145° C., using a concentration of polymer of 0.25%, by weight.

Another characteristic of the novel polymers of this invention which make them readily adaptable to film and fiber formation are their high melting points. In general, the melting points for the novel polymers of this invention are within the range of about 175° to about 250° C. and more preferably within the range of about 180° to about 230° C. Because of their high melting points the polymers of this invention can be heat pressed into clear, tough, pliable films which show no ill effects upon immersion in boiling water for periods of at least one hour.

Still another very desirable film and fiber-forming characteristic of the novel polymers of this invention is their crystallinity. Upon examination of these polymers by means of any of the well known X-ray diffraction techniques, they are found to be substantially crystalline.

The reaction which takes place in the process of this invention can be represented by the general equation:

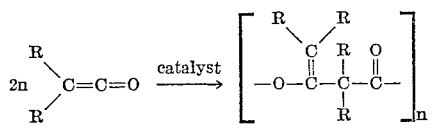

The polymerization of dialkyl ketenes according to this invention is carried out in the presence of a strongly basic catalyst. The catalysts are employed in catalytic amounts ranging from about 0.1 to 5% and more preferably about 0.5 to about 2%, by weight, based on monomer. Suitable catalysts are strongly basic compounds of metals from Groups I-A, II-A or III-A of the Periodic Chart ("Handbook of Chemistry," Lange, 9th Edition, Handbook Publishers, Inc., pages 56 and 57). Included within this group of metals are lithium, potassium, sodium, cesium, magnesium, calcium, barium, aluminum and the like. Good results are obtained with the metal alcoholates or alkoxides of the aforementioned metals, as exemplified by sodium, potassium or lithium methoxide, ethoxide, propoxide, butoxide and the like. In addition, other strongly basic compounds of these metals which give good results are alkali metal hydroxides and metal alkyls and aryls, as exemplified by calcium hydroxide, triethyl aluminum, butyl lithium, phenyl lithium and sodium amyl. Still other catalysts that can be used in the process of this invention are strongly basic quaternary ammonium hydroxides, such as dimethylbenzylammonium hydroxide and the like.

The temperatures employed in the polymerization process embodied in this invention are subject to wide variation and depend, to a large extent, upon the nature and reactivity of the monomer being polymerized as well as upon the nature and concentration of the catalyst employed. In general, however, it has been found that temperatures in the range of about −80° to about 50° C. will give good results, although temperatures within the range of about −75° to about 20° C. are preferred. The pressures employed, if any, should be such that at the temperature of operation at least some of the reaction mixture is in liquid phase.

The polymerization process embodied in this invention can be carried out batchwise or in a continuous flowing stream process. A continuous process is preferred for economic reasons, and particularly good results are obtained using continuous processes wherein a polymerization mixture of constant composition is continuously and progressively introduced into the polymerization zone and the mixture resulting from the polymerization is continuously and progressively withdrawn from the polymerization zone. Since it is well known that dialkyl ketenes form explosive peroxides at the low temperatures employed in the reaction, it is necessary to exclude air from the polymerization system. The reaction time is dependent upon a number of variables including catalyst concentration, temperature, and molecular weight of the polymer formed. However, the reaction can generally be run for periods of at least 0.5 hour to about 8 hours or more, with the preferred reaction time being about 2 to about 6 hours.

The polymerization reaction is carried out in the presence of solvent which facilitates contact between the catalyst and the starting material and aids in temperature control. The solvent can be any of the well known inert liquid organic solvents which do not freeze at the temperatures employed in the polymerization process and which do not react with either the reactants or the catalysts employed. In general, esters, ethers and hydrocarbons can be used with good results. Some typical inert liquid organic solvents which can be employed in the process of this invention include toluene, xylene, methylene chloride, methyl chloride, hexane, ethyl ether, ethyl acetate and the like. The polymer can be separated from the solvent by precipitation with a non-solvent, e.g. methanol, followed by filtration and drying at elevated temperatures.

This invention can be further illustrated by the following examples of preferred embodiments thereof although it will be understood that these examples are included merely for purposes of illustration and are not intended to limit the scope of the invention unless otherwise specifically indicated:

Example 1

As already indicated, the novel polymers of this invention are prepared by contacting a dialkyl ketene with a strongly basic catalyst in a solvent at low temperature. To illustrate, a solution of 10 ml. of distilled dimethyl ketene in 30 ml. of dry toluene is kept under a nitrogen atmosphere, cooled to −75° C. and 1 ml. of a solution of butyl lithium in pentane, containing 0.108 g. of butyl lithium per ml. of solution is added. The mixture is kept at −75° C. with occasional stirring for 6 hours. After warming to about 25° C., the reaction mixture is poured into 300 ml. of methanol. The polymer is isolated by filtration and dried in an oven at 80° C. The polymer weighs 6.8 g. and melts at 195–200° C. The inherent viscosity, as measured in tetralin at 145° C., is 0.34.

*Analysis.*—Calcd. for $(C_4H_6O)_n$: C, 68.6; H, 8.6. Found: C, 68.6; H, 8.5.

X-ray examination discloses that the polymer prepared according to this example is highly crystalline. The infrared spectrum of the polymer shows a doublet at 5.70 and 5.75µ, indicating ester groups. In contrast, the amorphous dimethyl ketene polymer prepared using amines as catalysts according to the method disclosed in Helv. Chim. Acta, 8, 322–332 (1925), shows bands at 5.65 and 5.85µ. The remainder of the spectrum bears no resemblance whatever to that of the polymer prepared according to this example.

Example 2

The structure assigned to the polymers of this invention can be confirmed by the results obtained by reducing them with lithium aluminum hydride to obtain 1-hydroxy-2,2,4-trimethyl-3-pentanone. To illustrate, a solution of 14 g. of dimethyl ketene polymer, prepared as in Example 1, in 200 ml. of tetrahydrofuran is slowly added to a stirred suspension of 3 g. (0.08 mole) of lithium aluminum hydride in 50 ml. of tetrahydrofuran over a period of 30 minutes. The reaction mixture is refluxed for 2 hours and after cooling to room temperature, 8 ml. of methanol is added. The entire mixture is poured into 100 ml. of 10% sulfuric acid solution, and the organic layer is separated. It is washed with water, dried over anhydrous magnesium sulfate and distilled. 11.8 g. (82%) of 1-hydroxy-2,2,4-trimethyl-3-pentanone having a boiling point of 108–110° C. (30 ml.), and a $n_D^{20}$ of 1.4382 is obtained.

*Analysis.*—Calcd. for $C_8H_{16}O_2$: C, 66.6; H, 11.1. Found: C, 66.5; H, 11.3.

Example 3

Using the same procedure as described in Example 1, 10 ml. of diethyl ketene, 20 ml. of toluene and 0.108 g. of butyl lithium give 6.4 g. of a solid, highly crystalline polymer melting at 220–230° C. The inherent viscosity, as measured in tetralin at 145° C., is 0.31.

Example 4

Although dimethyl ketene is preferred, other dialkyl ketenes can be employed in the process embodied in this invention with good results. Furthermore, these dialkyl ketenes can contain two different alkyl groups. Thus, a solution of 10 ml. of butyl-ethyl ketene in 30 ml. of xylene is kept under a nitrogen atmosphere, cooled to 0° C. and a solution of 0.2 g. of phenyl lithium in 2 ml. of ethyl ether is added. The mixture is stirred at 0° C. for 3 hours, warmed to about 25° C., and added to 300 ml. of methanol. The polymer is isolated by filtration and dried in an oven at 100° C. The high molecular weight, highly crystalline polymer weighs 5.3 g. and melts at 180–190° C. The inherent viscosity, as measured in tetralin at 145° C., is 0.26.

Example 5

As already indicated, a copolymer can be obtained by polymerizing a mixture of dialkyl ketenes. Thus, a solution of 35 g. (0.5 mole) of dimethyl ketene and 49 g. (0.5 mole) of diethyl ketene in 400 ml. of ether is kept under a nitrogen atmosphere and cooled to −40° C. 3 ml. of a solution of butyl lithium in pentane, containing 0.108 g. of butyl lithium per ml. of solution is added. The mixture is stirred at −40° C. for 2 hours, warmed to about 25° C. and poured into 100 ml. of ethanol. The copolymer is isolated by filtration and dried in an oven at 100° C. This copolymer weighs 69.5 g. and melts at 205°–212° C. The inherent viscosity, in tetralin at 145° C., is 0.41.

*Analysis.*—Calcd. for $(C_4H_6O=C_6H_{10}O)$: C, 71.5; H, 9.5. Found: C, 70.9; H, 9.2.

Example 6

Using the same procedure as described in Example 1, 10 ml. of distilled dimethyl ketene, 20 ml. of dry toluene, and 1 ml. of a solution of butyl lithium in pentane (containing 0.108 gram of butyl lithium per ml. of solution) is stirred at −75° C. for six hours. After warming to room temperature, the reaction mixture is poured into 500 ml. of methanol. The polymer is recovered by filtration and extracted in a Soxhlet extractor for 10 hours by refluxing with acetone. The resulting polymer weighs 5.3 grams and melts at 197–200° C. The inherent viscosity, as measured in tetralin at 145° C., is 0.90.

Thus, by the practice of this invention there is provided novel poly(enol ester) polymers of dialkyl ketenes having a combination of characteristics which make them suitable for making fibers and films exhibiting excellent physical properties that were not attainable heretofore. These polymers are thermally stable at elevated temperatures and can be spun into fibers of excellent quality, cast into tough films, or molded by conventional spinning, casting and molding techniques. A convenient method for preparing a film is to dissolve the polymer, e.g. the poly(enol ester) homopolymer of dimethyl ketene, in a solvent such as methylene chloride and then evaporate the solvent. Fibers can be conveniently spun from a polymer melt of any of the polymers of this invention. Furthermore, the presence of the ethylenic double bond in the polymers of this invention makes crosslinking possible and, therefore, makes the polymers useful in the preparation of varnishes, lacquers, etc. When used for such purposes, a solution of the polymer in an aromatic hydrocarbon is brushed or sprayed onto a substrate, e.g. wood or metal. Evaporation of the solvent leaves a tough clear film.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. The method for preparing dialkyl ketene polymers which comprises contacting at least one dialkyl ketene in which the alkyl groups contain from 1–4 carbon atoms, at a temperature in the range of about −80° to about 50° C. with at least a catalytic amount of butyl lithium.
2. The method for preparing dimethyl ketene polymers which comprises contacting dimethyl ketene at a temperature in the range of about −80° to about 50° C. with at least a catalytic amount of butyl lithium.
3. The method for preparing dimethyl ketene polymer which comprises contacting dimethyl ketene at a temperature of about −75° C., for a period of about 6 hours with a catalytic amount of butyl lithium.

References Cited by the Examiner

UNITED STATES PATENTS

| | | | |
|---|---|---|---|
| 2,361,036 | 10/1944 | Kung | 260—78.3 |
| 2,449,987 | 9/1948 | Gresham | 260—78.3 |
| 3,021,309 | 2/1962 | Cox et al. | 260—78.3 |
| 3,249,589 | 5/1966 | Natta et al. | 260—63 |

OTHER REFERENCES

Natta et al.: Journal American Chemical Society, vol. 82, pages 4742–3 (1960).

Furukawa et al.: "Polymerization of Diketene," Dic Makromolekulare Chemie, vol. 39, No. 3, August 1960, pages 243–245.

DONALD E. CZAJA, *Primary Examiner.*

LEON J. BERCOVITZ, H. BUESTEIN, *Examiners.*

G. W. RAUCHFUSS, H. D. ANDERSON, J. J. KLOCKO, *Assistant Examiners.*